United States Patent
McCarthy et al.

(10) Patent No.: US 6,282,313 B1
(45) Date of Patent: *Aug. 28, 2001

(54) USING A SET OF RESIDUAL IMAGES TO REPRESENT AN EXTENDED COLOR GAMUT DIGITAL IMAGE

(75) Inventors: Ann L. McCarthy, Pittsford; Kevin E. Spaulding, Spencerport; Edward J. Giorgianni, Rochester, all of NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/162,205

(22) Filed: Sep. 28, 1998

(51) Int. Cl.[7] ........................................ G06K 9/00
(52) U.S. Cl. ................................ 382/162; 358/523
(58) Field of Search .......................... 382/162–167, 382/240; 358/504–520, 523, 518, 1.9, 517; 348/431.1, 434.1; 345/153, 155

(56) References Cited

U.S. PATENT DOCUMENTS

| | | |
|---|---|---|
| 4,417,270 | 11/1983 | Nagao et al. . |
| 5,050,230 | 9/1991 | Jones et al. . |
| 5,268,754 * | 12/1993 | Van De Capelle et al. ......... 358/527 |
| 5,297,219 | 3/1994 | Weldy . |
| 5,317,425 * | 5/1994 | Spence et al. ....................... 358/504 |
| 5,333,069 * | 7/1994 | Spence ................................ 358/517 |
| 5,510,910 * | 4/1996 | Bockman et al. ................... 358/502 |
| 5,528,377 | 6/1996 | Hutcheson . |
| 5,539,540 | 7/1996 | Spaulding et al. . |
| 5,583,665 | 12/1996 | Gregory, Jr. et al. . |
| 5,583,666 | 12/1996 | Ellson et al. . |
| 5,666,215 | 9/1997 | Fredlund et al. . |
| 5,713,062 * | 1/1998 | Goodman et al. ................... 399/49 |
| 5,760,386 * | 6/1998 | Ward ................................... 235/493 |
| 5,892,891 | 4/1999 | Dalal et al. . |
| 5,949,967 * | 9/1999 | Spaulding et al. ................... 358/1.9 |
| 5,990,931 | 11/1999 | Nimri et al. . |
| 6,043,909 | 3/2000 | Holub . |

FOREIGN PATENT DOCUMENTS

| | | |
|---|---|---|
| 09-312777 | 12/1997 | (JP) . |
| 11-331622 | 11/1999 | (JP) . |
| WO 99/41734 | 8/1999 | (WO) . |

OTHER PUBLICATIONS

Lindley, Craig A., "JPEG–like Image Compression, part 1: Here's a C++ Class Library for JPEG–like Image Compression", Dr. Dobbs Journal, v. 20, n. 7, pp. 50–59, Jul. 1995.

English Language Translation of Claim 1 of Japanese Printed Patent Application No. 9–312777 (Kojima Misaki et al.), of Dec. 02, 1997, as translated by the Japanese Patent Office, p. 1.

Abrash, Michael, "Zen of Graphics Programming with Disk", IDG Books Worldwide, as reprinted from Dr Dobbs (TM) Graphics Books on CD–ROM, "Notes Before We Begin", reprinted as p. 1.

(List continued on next page.)

Primary Examiner—Joseph Mancuso
Assistant Examiner—Ali Bayat
(74) Attorney, Agent, or Firm—Raymond L. Owens

(57) ABSTRACT

A method for representing a digital image having color values with an extended color gamut in a storage color space having a limited color gamut includes adjusting the color values of the extended color gamut digital image to fit within the limited color gamut to form a limited color gamut digital image; representing the limited color gamut digital image in the storage color space; determining a set of residual images representing a difference between the extended color gamut digital image and the limited color gamut digital image; and associating the set of residual images with the limited color gamut digital image in the storage color space such that the associated residual images and the limited color gamut digital image is adapted to be used to form a reconstructed extended color gamut digital image.

41 Claims, 8 Drawing Sheets

OTHER PUBLICATIONS

Stroebel, Leslie et al., ed., "Encyclopedia of Photography", Boston: Focal Press, ISN 0–240–80059–1, p. 113.

R. S. Gentile, E. Walowit, and J. P. Allebach, "A comparison of techniques for color gamut mismatch compensation," J. Imaging Technol. 16, 176–181 (1990).

U.S. application No. 09/162,051, McCarthy et al., filed Sep. 28, 1998.

U.S. application No. 09/162,026, McCarthy et al., filed Sep. 28, 1998.

U.S. application No. 09/162,234, Spaulding et al., filed Sep. 28, 1998.

U.S. application No. 09/162,201, McCarthy et al., filed Sep. 28, 1998.

U.S. application No. 09/489,367, Spaulding et al., filed Jan. 21, 2000.

U.S. application No. 09/354,808, Parada et al., filed Jul. 16, 1999.

U.S. application No. 09/543,652, Spaulding et al., filed Apr. 5, 2000.

U.S. application No. 09/543,038, Spaulding et al., filed Apr. 5, 2000.

U.S. application No. 09/651,510, Spaulding et al., filed Aug. 30, 2000.

U.S. application No. 09/716,107, Spaulding et al., filed Nov. 17, 2000.

English Language Translation selected passages of Japanese Printed Patent Application No. 11–331622 (Okubo Akihito) of Nov. 30, 1999, as translated by the Japanese Patent Office, pp. 1–9.

* cited by examiner

USING A SET OF RESIDUAL IMAGES TO REPRESENT AN EXTENDED COLOR GAMUT DIGITAL IMAGE

CROSS REFERENCE TO RELATED APPLICATIONS

Reference is made to commonly assigned U.S. patent application Ser. No. 09/162,051 filed Sep. 28, 1998, entitled "Representing an Extended Color Gamut Digital Image in a Limited Color Gamut Color Space" to McCarthy et al; U.S. patent application Ser. No. 09/662,026, filed Sep. 28, 1998, entitled "Using a Residual Image to Represent an Extended Color Gamut Digital Image" to McCarthy et al; U.S. patent application Ser. No. 09/162,234, filed Sep. 28, 1998, entitled "Method of Applying Manipulation to an Extended Color Gamut Digital Image" to Spaulding et al; and U.S. patent application Ser. No. 09/162,208, filed Sep. 28, 1998, entitled "A System Using One or More Residual Image(s) to Represent an Extended Color Gamut Digital Image" to McCarthy et al, the disclosures of which are incorporated herein by reference.

FIELD OF THE INVENTION

The present invention relates to the field of digital imaging, and more particularly to representing an extended color gamut digital image.

BACKGROUND OF THE INVENTION

In digital imaging systems, there are many ways to represent images in digital form. Not only are there many different formats of digital files, but there are also a large variety of different color spaces and color encodings that can be used to specify the color of digital images.

In some cases, the color encoding can be in terms of a so-called device independent color space, such as the well-known CIELAB color space. In recent years this color space has been used extensively to specify the color of digital images in color-managed digital imaging systems. In some cases, the image can actually be stored in the CIELAB color space. More commonly, the color space can be used to connect device profiles, which can be used to describe the color characteristics of various color imaging devices such as scanners, printers, and CRT video displays. The KODAK PhotoYCC Color Interchange Space is another example of a device independent color space that can be used to encode digital images.

In other cases, the color-encoding can be in terms of a device dependent color space. Video RGB color spaces and CMYK color spaces are examples of this type. When a color image is encoded in a device dependent color space, it will have the desired color appearance when it is displayed on the particular output device associated with that color space. The advantage of a device dependent color space is that the image is ready to be displayed or printed on the target device. However, the disadvantage is that the image will necessarily be limited to the color gamut of the target device. The color gamut of an imaging device refers to the range of colors and luminance values that can be produced by the device. Therefore, if the target device has a limited dynamic range, or is incapable of reproducing certain saturated colors, then it is not possible to encode color values outside of the range of colors that can be produced on the device.

One type of device dependent color space that has become quite widespread for use as a storage and manipulation color space for digital images is the video RGB color space. In reality, there are many different video RGB color spaces due to the fact that there are many different types of video RGB displays. As a result, a particular set of video RGB color values will correspond to one color on one video display and to another color on another video display. Therefore, video RGB has historically been a somewhat ambiguous color representation due to the fact that the color values could not be properly interpreted unless the characteristics of the target video display were known. Nonetheless, video RGB color spaces have become the defacto standard in many applications because the creation, display and editing of images on video displays are central steps in many digital imaging systems.

Recently, there have been efforts to standardize a particular video RGB color space in order to remove the ambiguity in the interpretation of the color values. (See the proposed IEC TC100 sRGB Draft Standard) One such proposed standard color space is known as "sRGB." This color space specifies a particular set of red, green, and blue primaries, a particular whitepoint, and a particular non-linear code value to light intensity relationship. Together, these tightly define the overall relationship between the digital code values and the corresponding device independent color values.

Although the use of a standard video RGB color space eliminates much of the ambiguity usually associated with video RGB color spaces, it does nothing to address the fact that this color space has a limited color gamut relative to other output devices. Additionally, any output device will have a limited color gamut relative to that of an original scene. For example, a scene can have a luminance dynamic range of 1000:1 or more, whereas a typical video display or reflection print will have a dynamic range on the order of 100:1. Certain image capture devices, such as photographic negative film, can actually record dynamic ranges as large as 8000:1. Even though this is larger than the luminance dynamic range associated with most scenes, the extra dynamic range is often useful to provide allowance for exposure errors, light source variations, etc.

In order to encode images from various sources in a video RGB representation, it is necessary to discard information that is outside the color gamut of the video RGB color space. In some cases, such as when it is desired to encode the appearance of colors in an original scene or the colors captured by a photographic negative, a great deal of information will typically need to be discarded due to the large disparity in the dynamic ranges. For the case where it is desired to scan a reflection print and store it in a video RGB color space, it is still necessary to discard a substantial amount of information due to the mismatch in the color gamuts, even though the luminance dynamic ranges can be quite similar.

For example, FIG. 1 shows a comparison of a typical Video RGB Color Gamut 10 and a typical Reflection Print Color Gamut 12. In this case, a*-b* cross-sections of the color gamuts are shown in the CIELAB space at an L* of 65. The colors that are inside the boundary are within the gamuts of the respective devices, while those that are outside the boundary cannot be reproduced, and are therefore referred to as "out-of-gamut" colors. It can be seen that there is a large set of color values with a b* value larger than 60 that can be produced on the printer, but are outside the color gamut of the video display. As a result, if the reflection print were scanned and stored in a video RGB color space, it would not be possible to encode this color information.

The mismatch between the video RGB color gamut and the color gamuts of other output devices and image sources represents a serious limitation on the usefulness of the video RGB color space. However, in many cases, the convenience of storing the image in a color space that is ready for direct display on a computer video CRT has been the over-riding factor in the determination of the preferred color space. This has come at the expense of applications that can utilize the extended color gamut information that may have existed in an input image.

SUMMARY OF THE INVENTION

It is an object of the present invention to overcome the limitations of the prior art by permitting the storage of images in a color space having a limited color gamut, while retaining the extended color gamut information.

This object is achieved in a method for representing a digital image with an extended color gamut in a storage color space having a limited color gamut comprising the steps of:

a) adjusting the color values of the extended color gamut digital image to fit within the limited color gamut to form a limited color gamut digital image;

b) representing the limited color gamut digital image in the storage color space;

c) determining a set of residual images representing differences between the extended color gamut digital image and the limited color gamut digital image; and d) associating the set of residual images with the limited color gamut digital image in the storage color space such that the associated set of residual images and the limited color gamut digital image is adapted to be used to form a reconstructed extended color gamut digital image.

ADVANTAGES

The present invention has the advantage that a digital image can be stored in a color space convenient for a particular application while overcoming the color gamut limitation associated with that color space.

It has the additional advantage that the use of the extended color gamut information is optional. As a result, the benefits of the extended color gamut information can be gained by applications that are able to make use of it, without introducing an image quality or computation penalty for applications that do not require the optional information or that are not able to make use of it.

The image, for example, can be stored in a video RGB color space that is well-adapted for fast and convenient display on a computer system without compromising the potential quality of the image.

DETAILED DESCRIPTION OF THE INVENTION

Figure 2:
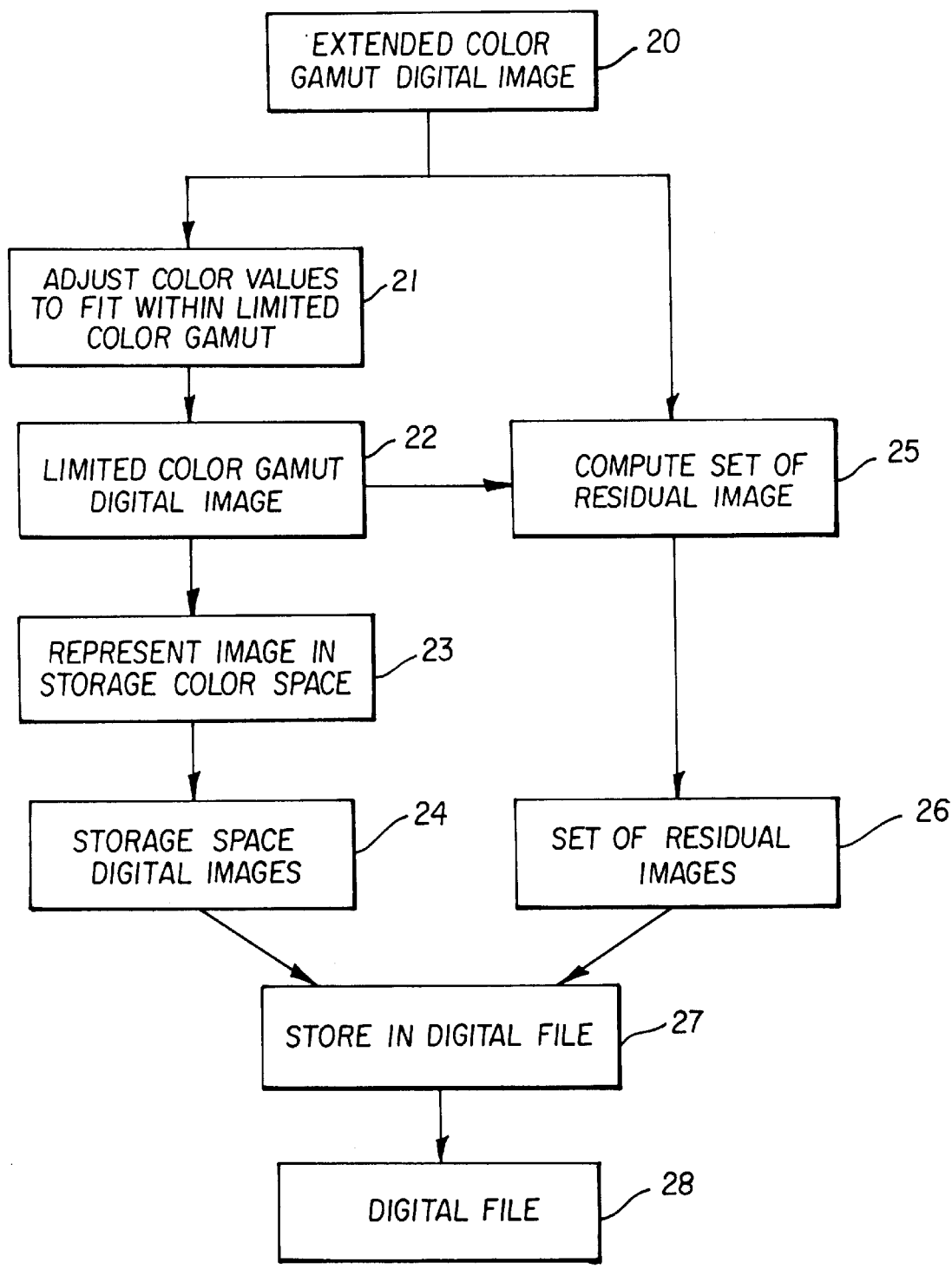
FIG. 2 is a flowchart showing a process for making a limited gamut digital image in accordance with the present invention.

One preferred embodiment of the present invention is shown in FIG. 2. An extended color gamut digital image 20 has color values that are outside the limited color gamut of a storage color space. An adjust color values step 21 is used to limit the color values to those that will fit within the limited color gamut of the storage color space to form a limited color gamut digital image 22. Next, a represent image in storage color space step 23 is used to produce a storage space digital image 24. A compute set of associated residual image step 25 is used to determine a set of residual images 26 representing the difference between the extended color gamut digital image and the limited color gamut digital image. The storage space digital image 24 and the residual images 26 are then stored in a digital file 28 using a digital file storage step 27.

A key aspect of the present invention is the creation of the set of residual images 26 representing the difference between the extended color gamut digital image and the limited color gamut digital image. Other prior art systems include the computation of a residual image, but none involve computing a difference between an extended color gamut digital image and a limited color gamut digital image. Nishihara et al. (U.S. Pat. No. 4,903,317) describe the computation of a residual image determined from the difference between an original image, and an image that has been compressed using a lossy image data compression technique and subsequently decompressed. The residual image represents the compression artifacts that are introduced during the compression/decompression process. Golin (U.S. Pat. No. 5,122,873) also describes a method for encoding images using a residual image. In this case, the residual image relates to the difference between images of different spatial resolution. It is also known that a residual image can be computed between a high-precision digital image, and a low-precision digital image. In each of these cases, the images being differenced have identical color gamuts and color spaces. As a result, none of these prior art configurations would support the storage of extended color gamut information as required in the present invention.

There are several reasons why it may be advantageous to store a set of residual images instead of just a single residual image. For example, it might be desirable to store residual errors associated with luminance errors in one residual image, and residual errors associated with chrominance errors in additional residual images. This would enable an application to make a choice about which types of residual errors it would use during the process of determining a reconstructed extended color gamut digital image.

In another embodiment, each residual image in a set of residual images can also correspond to a different subset of extended dynamic range image data. For example, a first residual image can extend the dynamic range of the digital image some fixed amount beyond the dynamic range associated with the limited color gamut digital image. A second residual image can then extend the dynamic range an additional increment beyond the extended dynamic range associated with the first residual image. In this way, an application using the extended color gamut digital image can use only the residual images associated with the amount of extended dynamic range required by the application.

Another reason that using multiple residual images is useful is for cases where the residual images are stored in tags in the digital file having a limited size. In this case, the residual image data can be broken into smaller pieces that would fit within the size limitations. For example, residual images can be determined for subsets of pixels in the extended color gamut digital image. In this way, the residual image data can be stored in a tiled fashion.

Each of the aspects of the invention shown in FIG. 2 will now be discussed in more detail. The extended color gamut digital image 20 can take many different forms. For example, the image can be a scanned photographic print, a scanned photographic negative, a scanned photographic transparency, or an image from a digital camera, etc. Depending on the source of the image, as well as any image processing that has been applied to the image, the image can have very different color gamuts and color representations. Images from scanned photographic negatives and digital cameras can contain scene information having a much larger dynamic range than can be encoded in many storage color spaces. In this case, dynamic range is simply one aspect of color gamut related to the range of luminance values that can be represented.

The color gamut of an imaging system is the range of colors that can be represented or produced. Since color is fundamentally a three-dimensional phenomenon, color gamuts can be viewed as a three-dimensional volume. Color values that are within the volume are said to be "in-gamut," whereas colors that are outside the volume are said to be "out-of-gamut." One aspect of the color gamut is the luminance dynamic range of the system. This is the range of relative luminance values that can be encoded by the system from the whitest white to the blackest black. Another aspect of the color gamut is the range of chroma values that can be represented from a neutral out to a saturated color. The extended color gamut digital image will generally have a larger luminance dynamic range and a larger range of chroma values than the limited color gamut digital image. The range of chroma values that are in-gamut will generally be a function of hue and lightness. Generally, the highest chroma colors can be produced near the hue and lightness of the primary and secondary colors of a given imaging device or color space (usually red, green, blue, cyan, magenta and yellow).

If the image were a scanned photograph, the color gamut of the image would generally be the color gamut of the original photographic print medium. Likewise, if the image were captured by a digital camera, the color gamut of the image would generally be that of an original scene, although it can be limited by the dynamic range of the camera sensor and by lens flare. The color space that the image is represented in is somewhat independent of the color gamut of the original image. For example, the color values for a scanned photograph can be represented as raw scanner code values, or they can be given by device independent color values according to a color space such as the CEELAB color space. Alternatively, the color values can be expressed in some other color space.

Figure 1:
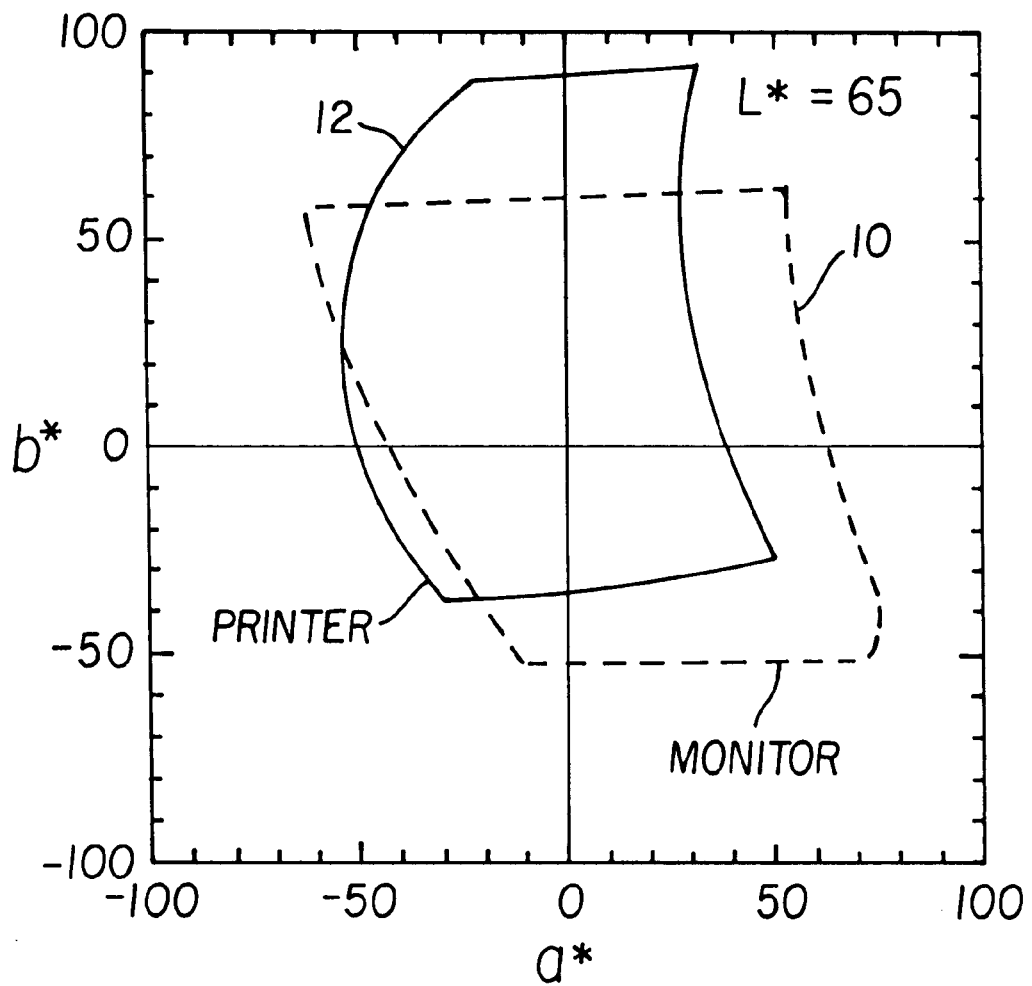
FIG. 1 is graph comparing the color gamuts of a typical video display, and a typical reflection print.

For many applications, it is convenient to store, display and manipulate the digital image in a particular storage color space that is well-suited for the work flow associated with that application. Frequently, the storage color space that is chosen will be a device dependent color space associated with a common output device or medium used by the system. In many cases, video RGB color spaces are used because they can be displayed or previewed directly on a computer video display without any further processing. Additionally, many software applications that are available to manipulate images on a computer are designed to work with images in a video RGB color space. The color gamut of the storage color space will often be smaller than, or at least different than, the color gamut of the extended color gamut digital image 20. As a result, there generally will be colors in the extended color gamut digital image 20 that can not be represented in the storage color space. For example, consider the case where the extended color gamut digital image 20 is a scanned photographic print. There are many colors within the color gamut of the reflection print that are outside the color gamut of the video RGB color space. This can clearly be seen in FIG. 1 which shows cross-sections through a typical Video RGB Color Gamut 10, and a typical Reflection Print Color Gamut 12.

Therefore, information must be discarded in order to store the reflection print color values in a video RGB color space, or any other limited color gamut storage space. This effect is even more severe for cases where the extended color gamut digital images comes from sources such as a digital camera, or the scan of a photographic negative, where there is a large amount of extended luminance dynamic range information in addition to extended chroma information. In prior art methods, the information that is discarded is lost permanently and can not be recovered. In the present invention, the information that is lost will be stored in a set of residual images.

The adjust color values step 21 is used to adjust the color values of the extended color gamut digital image to fit within the limited color gamut of the storage space, forming a limited color gamut digital image 22. In this step, information must be discarded when color values that are outside the limited color gamut are mapped to color values within the limited color gamut. In some cases, the color values for the out-of-gamut colors are simply "clipped," i.e., they are mapped to color values the surface of the limited color gamut. In other cases, more sophisticated gamut mapping methods can be used to compress the extended color gamut into the limited color gamut without introducing a hard clipping function. For example, the chroma of the input color values can be scaled so that the most saturated colors in the extended color gamut are mapped to the most saturated colors in the limited color gamut. Alternatively, a gamut mapping method can be used that is designed to preserve color appearance as closely as possible. Regardless of what gamut mapping technique is used, there will necessarily be a loss of information and a distortion of the color characteristics of the image.

In many cases, the extended color gamut will contain color values that have higher chroma values than can be represented in the limited color gamut. In some cases, the extended color gamut can also have a larger luminance dynamic range than can be represented in the limited color gamut. In the case where it is necessary to reduce the luminance dynamic range of the image, one part in the implementation of the adjust color values step 21 is typically the application of a tonescale function. The tonescale function might be applied to a luminance channel of the image, or alternatively to each color channel of an RGB color representation. In some applications, the image being processed can actually be a monochrome image, e.g., a black-and-white image. In this case, the tonescale function would be applied to the image luminance values.

For cases where the extended color gamut digital image is a representation of the colors in an original scene, the adjust color values step 21 will typically involve determining reproduced color values that will produce desired aim colors on a target output device. For example, optimal color reproduction aims can be applied to determine desired video RGB aim colors for the original scene colors. The process of transforming the original scene color values into aim reproduced color values is sometimes referred to as "rendering" the image.

Once the limited color gamut digital image 22 has been determined, the next step is to represent it in the storage color space using the represent image in storage color space step 23. The output of this step is a storage space digital image 24. This step typically involves applying a device model, or a color space conversion, to determine the storage space color values that correspond to the adjusted color values of the limited color gamut digital image 22. For example, if the adjusted color values were specified in terms of the CIELAB color space, a video display device model can be used to determine the corresponding video RGB values that would be necessary to produce the specified adjusted color values.

A compute set of residual images step 25 is used to determine a set of residual images 26 representing the difference between the extended color gamut digital image and the limited color gamut digital image 22. In its simplest form, a single residual image can be calculated by simply subtracting the adjusted color values of the limited color gamut digital image 22 from the input color values of the extended color gamut digital image 20. The residual image would then be in terms of the color space used to represent those color values. Alternatively, the color values can be transformed into some other space that would be useful for computing the residual image. For example, it might be desirable to compute the residual image in a color space that is well-suited for compressing the residual image or that is convenient for use in reconstructing the extended color gamut digital image. Generally, the extended color gamut digital image and the limited color gamut digital image 22 should be represented in the same color space before the residual image is calculated so that the in-gamut colors will be given by zero residual errors. Since most images will only have a small fraction of color values that are out of gamut, the residual image will be dominated by zeros, and therefore will be highly compressible. Different variations of this concept using multiple residual images will be discussed in more detail later.

For cases where the adjust color values step 21 involves the application of a transform that modifies the color values for the colors within the limited color gamut as well as those outside the limited color gamut, a residual image determined by directly computing the difference between the input color values of the extended color gamut digital image and the adjusted color values of the limited color gamut digital image 22 would have a large number of non-zero values. This can be undesirable for cases where the residual image is to be compressed. The prior example where the extended color gamut digital image is a representation of the original scene, and the adjust color values step 21 includes rendering the color values to determine desirable color values for a target output device, will generally suffer from this problem. In this case, it may be desirable to apply a second rendering function to the extended color gamut digital image to determine a second set of rendered color values that are desirable for another output device having a larger color gamut than the first target output device. If the second rendering function were identical to the first rendering function throughout most of the color gamut, then a residual image computed by taking the difference between the first and second rendered images would again be largely dominated by zero differences. In one preferred embodiment of the present invention, the first rendering function would produce a rendered image that is optimized for a video display, and the second rendering function would produce a rendered image that is optimized for some hypothetical output device having an idealized large color gamut.

Once the set of residual images 26 has been calculated, it should be associated in some fashion with the storage space digital image 24. This can involve storing the set of residual images 26 in a memory buffer that is associated with a second memory buffer used to store the storage space digital image 24. Alternatively, many applications will store the image data in a digital file 28 on some sort of digital storage media such as a magnetic disk, an optical disk, or a PCMCIA card using a digital file storage step 27. In this case, the storage space digital image 24 and the set of residual images 26 can be stored in two different files, or can be stored in the same digital image file. In many cases, the file format used to store the storage space digital image 24 may support the use of private image tags. For example, the file formats TIFF, EXIF and FlashPIX all support tags of this sort. These tags are sometimes referred to as meta-data. In cases where file formats of this type are used, it will be convenient to store the residual image data in the form of a residual image tag. In this way, applications that do not know how to make use of the residual image tag will simply ignore it, and will therefore have access only to the storage space digital image 24. Whereas applications that know how to use the residual image tag will be able to make use of it to reconstruct the extended color gamut digital image. Some file formats lace a limit on the size of tags, so compression of the residual image is important for these applications.

Figure 3:
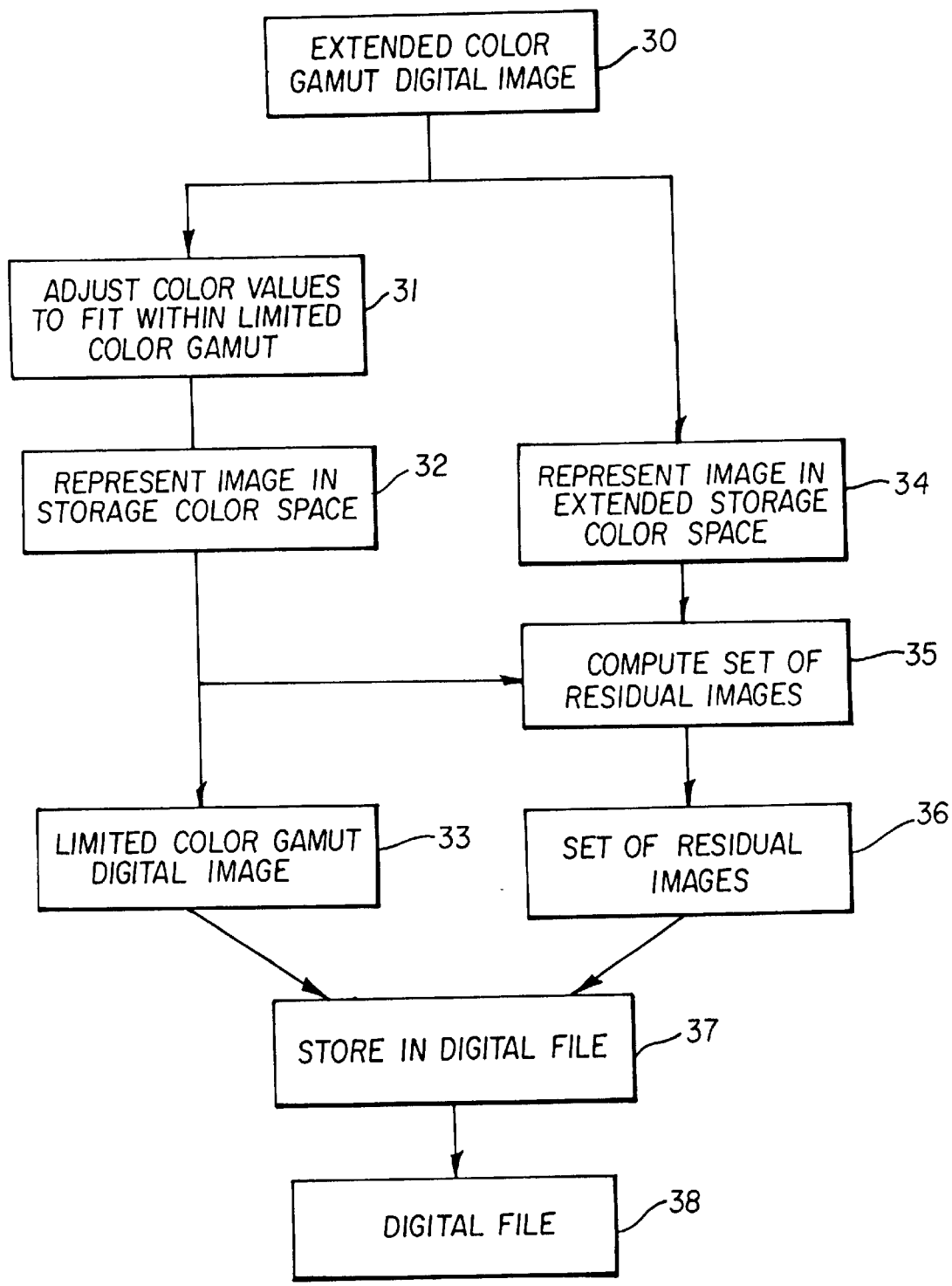
FIG. 3 is a flowchart showing a second process for making a limited gamut digital image in accordance with the present invention.

A second preferred embodiment of the present invention is shown in FIG. 3. This embodiment is similar to that shown in FIG. 2 but differs in the way that the set of residual images is determined. In this second embodiment, the set of residual images is represented relative to the code values of the storage color space. FIG. 3 shows an extended color gamut digital image 30, having color values that are outside the limited color gamut of a storage color space. An adjust color values step 31 is used to limit the color values to those that will fit within the limited color gamut of the storage color space. Next, a represent image in storage color space step 32 is used to produce a limited color gamut digital image 33. A represent image in extended storage color space step 34 is then applied to the original image, and a compute set of residual images step 35 is used to determine a set of residual images 36 representing the difference between the extended color gamut digital image and the limited color gamut digital image, both being encoded according to the storage color space. The limited color gamut digital image 33 and the set of residual images 36 are then stored in a digital file 38 using a digital file storage step 37.

Since most of the steps in this second embodiment of the invention are identical to the corresponding steps in the first embodiment, only the steps that differ will be discussed in more detail. The primary difference between the two embodiments is that the residual image is computed relative to the storage color space color values in this case. Therefore, the original extended color space digital image must be transformed to the storage color space in addition to the limited color gamut digital image. This is accomplished by the represent image in extended storage color space step 34. The complication is that the storage color space will typically only have a limited color gamut. For example, if the storage color space is a video RGB color space, then the color gamut of the storage space would be limited to the color gamut of the video display. Therefore, to represent the original extended color gamut digital image in the storage color space, it is necessary to define an extended version of the storage color space that does not impose the limited color gamut. For example, 24-bit video RGB color spaces usually encode the color values in terms of integer code values in the range of 0 to 255. In order to allow the encoding of colors outside the color gamut of the video display, the original extended color gamut digital image can be represented in an extended storage space where the code values were allowed to go outside the range 0 to 255. This would permit the encoding of colors with higher chroma values, as well as larger luminance dynamic range values, than can be encoded directly in the storage color space. After both the limited color gamut digital image and the extended color gamut digital image had been represented in terms of the storage color space, the set of residual images 36 is then calculated as before from the difference between the two images.

The result of applying the method of the present invention is the creation of both a limited color gamut digital image in a storage color space and an associated set of residual images which correlates the limited color gamut digital image to an extended color gamut digital image. As discussed previously, the limited color gamut digital image is generally well suited for display on a target output device such as a video display. One advantage of this approach is that systems that cannot make use of the set of residual images will be able to display and manipulate this image directly with no image quality or computation disadvantage relative to the prior art where only the limited color gamut digital image is stored. However, the information that normally would have been discarded has now been stored in the set of residual images and is available for use by systems that can utilize it. In this case, the limited color gamut digital image is extracted and the set of residual images from the digital file is used to form a reconstructed extended color gamut digital image.

Figure 4:
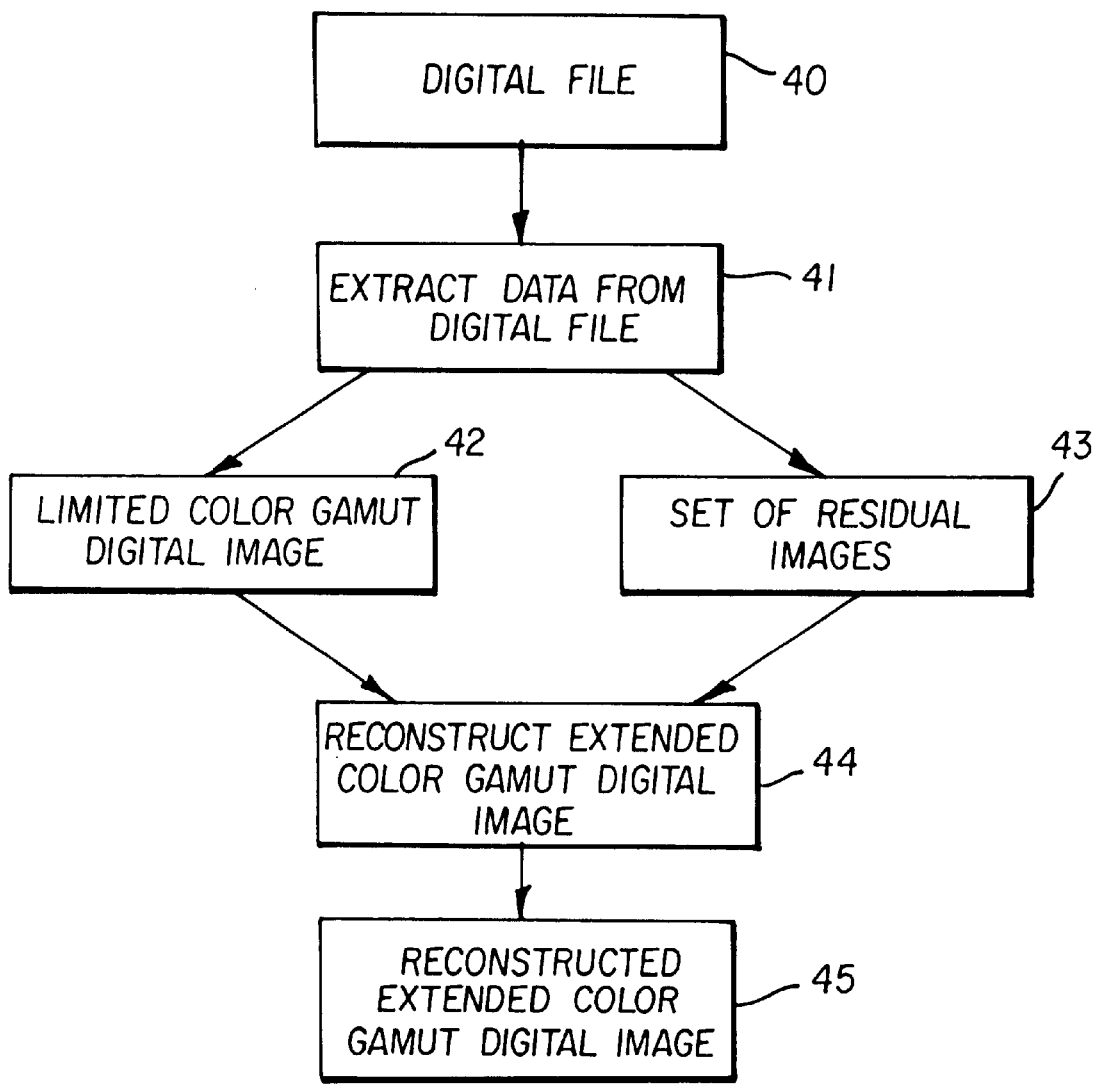
FIG. 4 is a flowchart showing the reconstruction of a extended gamut digital image from the limited digital image of FIG. 2.

FIG. 4 shows an example of reconstructing an extended color gamut digital image from the limited color gamut digital image and the set of residual images. The input to this process is an extended color gamut digital file 40 containing a limited color gamut digital image and a residual image created as described above. An extract data from digital file step 41 is used to extract the limited color gamut digital image 42 and the set of residual images 43. A reconstruct extended color gamut digital image step 44 is then used to form a reconstructed extended color gamut digital image 45 by combining the limited color gamut digital image 42 and the set of residual images 43. Typically the reconstruct extended color gamut digital image step 44 will involve combining the limited color gamut digital image 42 and the set of residual images 43.

The reconstructed extended color gamut digital image can be used for many different purposes. For example, it can be used to form a digital image appropriate for display on an output device having a color gamut different from the limited color gamut of the limited color gamut digital image 42 in the digital file 40. This enables the generation of an optimal print from the original extended color gamut digital image, rather than a print limited by constraints of the storage color space.

Alternatively, the information in the reconstructed extended color gamut digital image can be used during the process of applying a modification to the digital image. For example, consider the case where the original image is determined to be over-exposed. In this case, the highlights of the limited color gamut digital image would have been clipped during the adjust color values step. However, the highlight information would be restored in the reconstructed extended color gamut digital image. This information can then be used to produce a modified digital image that retains the highlight detail. Modifications to the digital image can be interactively specified by a user, such as in the case of a user adjustable lightness knob. Modifications can also be determined by applying an automatic algorithm to the digital image. For example, a "scene balance algorithm" can be used to estimate the best color balance and lightness level for an image.

In some cases, it will be desirable to send the modified digital image directly to a printer, but in other cases it may be desirable to write the modified image back out to a file. In this case, a new limited color gamut digital image and a new set of residual images can be calculated to encode the modified image, using the methods described by this invention.

Figure 5:
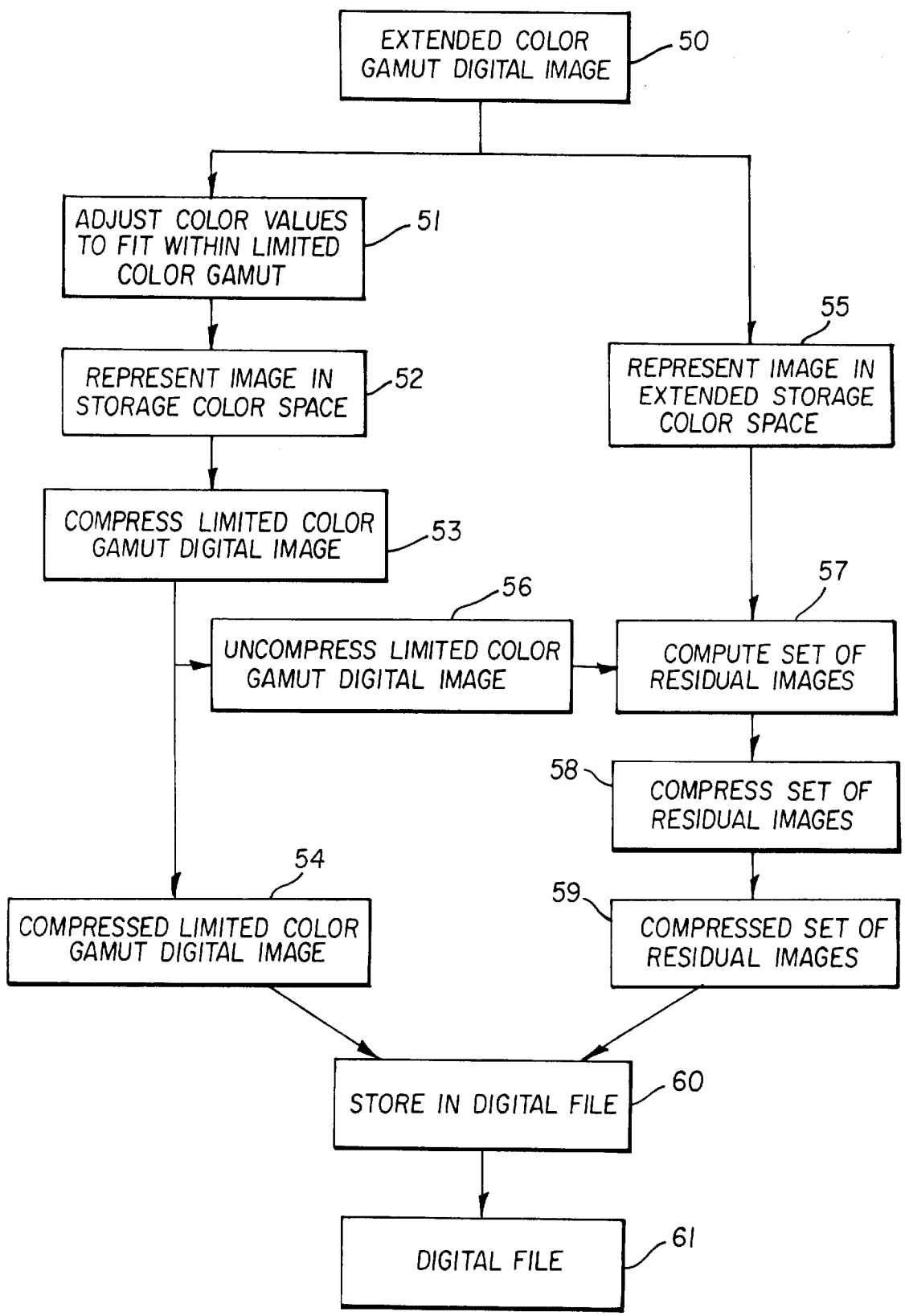
FIG. 5 is a flowchart showing a third process for making a limited gamut digital image in accordance with the present invention.

Another embodiment of the present invention is shown in FIG. 5. As in the previously discussed embodiments, an extended color gamut digital image 50 has color values that are outside the limited color gamut of a storage color space, and an adjust color values step 51 is used to limit the color values to those that will fit within the limited color gamut of the storage color space. Next, a represent image in storage color space step 52 is used to produce a limited color gamut digital image. In this case, the limited color gamut digital image is compressed using a compress limited color gamut digital image step 53 to form a compressed limited color gamut digital image 54. The compress limited color gamut digital image step 53 can be performed using any one of many image data compression methods such as the well-known JPEG compression method which is based on a discrete cosine transform. There are many other types of compression methods known to those skilled in the art including those based on differential pulse code modulation, vector quantization, wavelets, or fractals. In some cases, the compression algorithms are lossless, meaning that an exact copy of the original image can be reconstructed from the compressed image. However, in many cases, the compression images are lossy meaning that an image which is reconstructed from the compressed image will only be an approximation of the original image. In these cases, the use of image data compression will introduce errors into the digital image.

The process of computing the set of residual images in this embodiment of the present invention is slightly modified relative to the previous embodiments. Rather than computing the set of residual images based on the limited color gamut digital image itself, the set of residual images is computed from the compressed limited color gamut digital image. In this way, the set of residual images not only includes the differences introduced by representing the image in the limited color gamut, but it also accounts for losses introduced in the compression process. In particular the compute set of residual images step 57 computes the difference between the extended color gamut digital image as represented in an extended storage color space using a represent image in extended storage color space step 55, and an uncompressed limited color gamut digital image computed from the compressed limited color gamut digital image 54 by an uncompress limited color gamut digital image step 56. It will frequently be desirable to compress each resulting residual image using a compress residual images step 58 to form a set of compressed residual images 59. The compress residual images step 58 can be performed using many different types of image data compression methods. In some cases, it may be desirable to compress the set of residual images using a lossless image data compression method, whereas in other cases, it will be acceptable to use a so-called lossy image data compression method. The compressed limited color gamut digital image 54 and the compressed residual images 59 are then stored in a digital file 61 using a digital file storage step 60.

Figure 6:
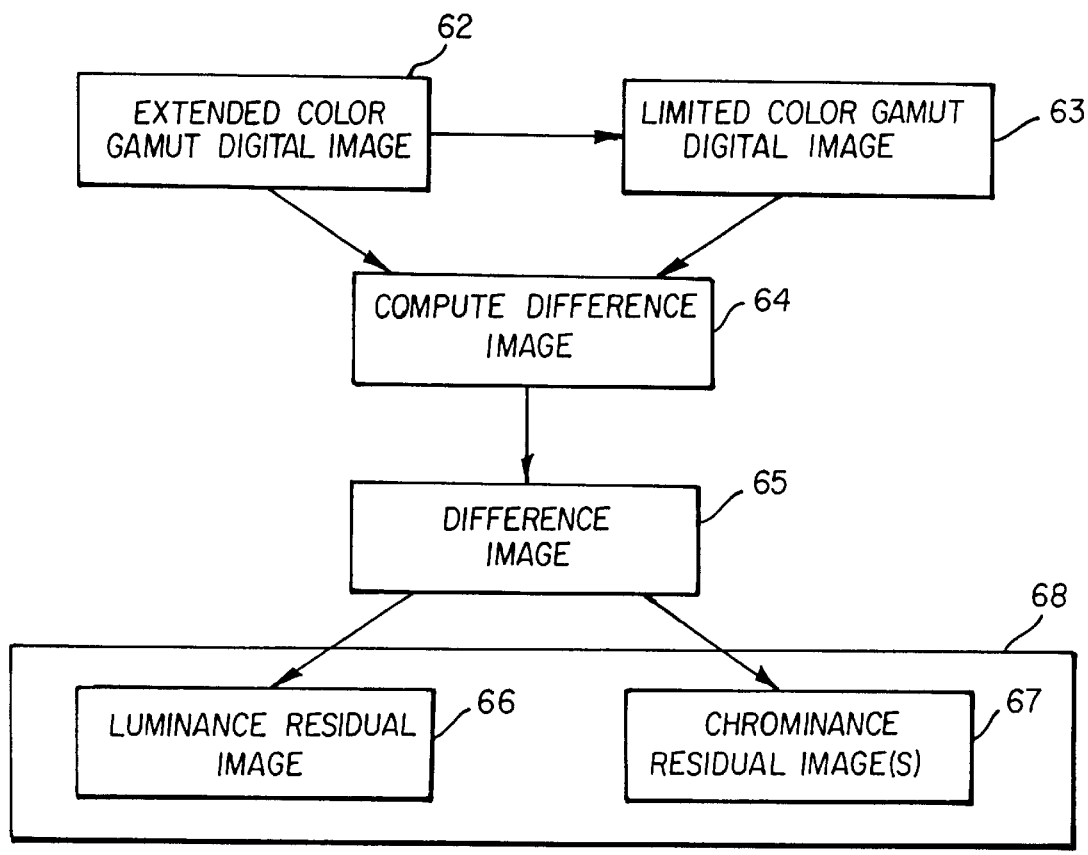
FIG. 6 is a flowchart showing a process for making a set of residual images in accordance with the present invention.

As mentioned above, there are a number of ways to form the set of residual images associated with the present invention. Several of these methods will now be described in more detail. In a first variation, residual errors associated with luminance clipping are encoded in one residual image, and residual errors associated with chrominance clipping are encoded in additional residual images. This will enable an application to make a choice about which types of residual errors it would like to use during the process of determining a reconstructed extended color gamut digital image. FIG. 6 is a flowchart illustrating the creation of a set of residual images using this approach. An extended color gamut digital image 62 is used to create a limited color gamut digital image 63 as has been described above. A difference image 65 is then determined by computing a difference between the extended color gamut digital image 62 and the limited color gamut digital image 63 using a compute difference image step 64. The difference image is then decomposed into a luminance residual image 66 and one or more chrominance residual image(s) 67. The luminance residual image 66 and the one or more chrominance residual image(s) 67 taken together form a set of residual images 68. The one or more chrominance residual image(s) 67 will generally be comprised of two chrominance residual images corresponding to color difference signals in some color space. The luminance and chrominance residual images can be determined in any luminance-chrominance type color representation, such as the well-known CIELAB or YCrCb color spaces.

Figure 7:
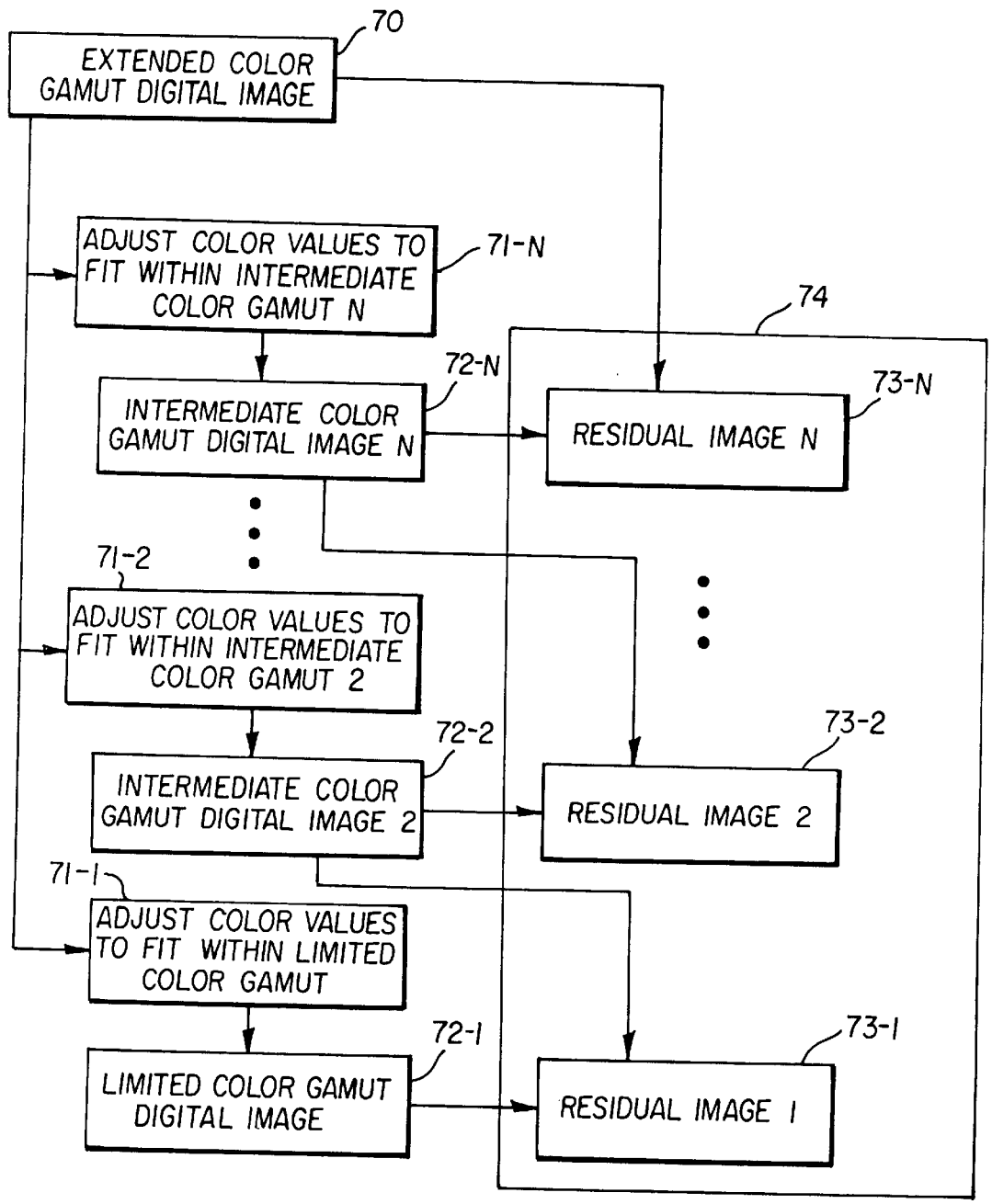
FIG. 7 is a flowchart showing a second process for making a set of residual images in accordance with the present invention.

In another variation, each residual image in the set of residual images corresponds to a different subset of extended color gamut digital image data. For example, a first residual image can extend the color gamut of the digital image some fixed amount beyond the color gamut associated with the limited color gamut digital image. A second residual image can then extend the color gamut an additional increment beyond the extended color gamut associated with the first residual image. In this way, an application using the extended color gamut digital image can select only the residual images associated with the amount of extended color gamut required by the application. This approach is illustrated in FIG. 7. In this case, an adjust color values to fit within limited color gamut step 71-1 is applied to an extended color gamut digital image 70 to form a limited color gamut digital image 72-1 as before. Additionally a set of adjust color values to fit within intermediate color gamut steps 71-2 through 71-N are used to create a set of intermediate color gamut digital images 72-2 through 72-N, where the intermediate color gamut 2 is larger than the limited color gamut, the intermediate color gamut 3 is larger than the intermediate color gamut 2, and so forth. In particular, one configuration of importance corresponds to the case where each intermediate color gamut has a larger dynamic range than the one before. A series of residual images 73-1 through 73-N are then created by computing differences between successive limited color gamut digital images. For example, the first residual image 73-1 is computed from the difference between the intermediate color gamut digital image 72-2 and the limited color gamut digital image 72-1. The second residual image 73-2 is computed from the difference between the intermediate color gamut digital image 72-3 and the intermediate color gamut digital image 72-2, and so on until the last residual image 73-N which is computed from the difference between the original extended color gamut digital image 70 and the last intermediate color gamut digital image 72-N. The series of residual images 73-1 through 73-N taken together form a set of residual images 74. Each of the residual images in the set of residual images 74 encodes an extra layer of the extended color gamut information.

Figure 8:
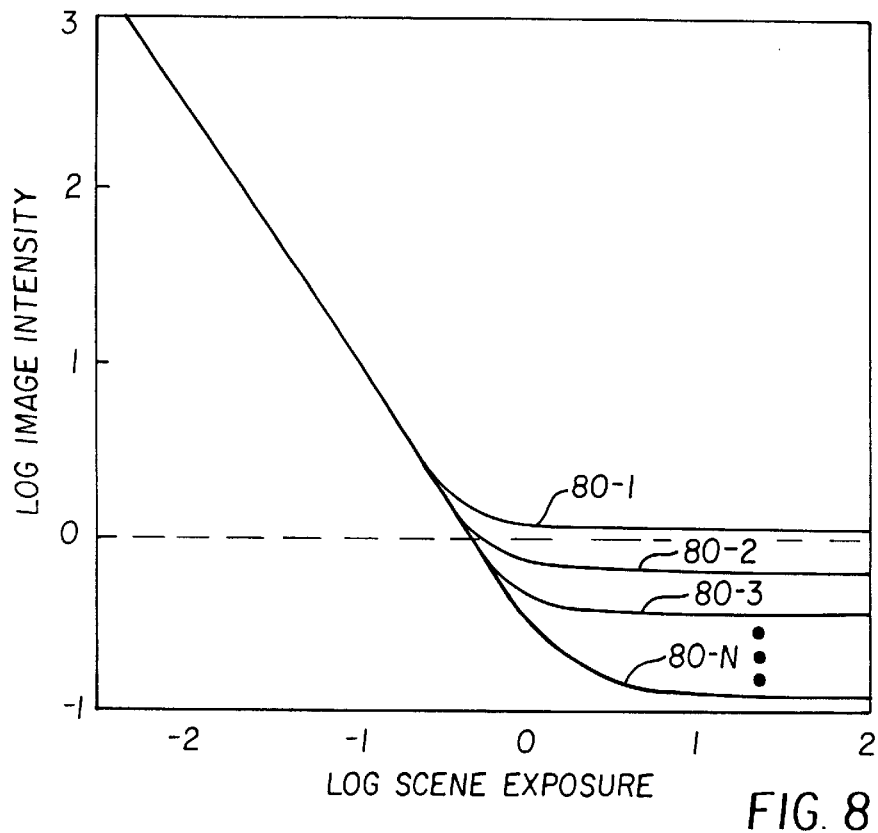
FIG. 8 is a graph portraying a set of tonescale functions.

One method for computing the set of N intermediate color gamut digital images 72-1 through 72-N is shown in FIG. 8. This example corresponds to the case where the extended color gamut digital image corresponds to an original scene as measured by a digital camera, or as inferred from the scan of a photographic negative. Since the limited color gamut digital image 72-1 has a much smaller dynamic range than that of an original scene, it is necessary to use a tonescale function to map the input dynamic range into the limited dynamic range. An example tonescale function 80-1 that can be used as part of the adjust color values to fit within limited color gamut step 71-1 is shown for illustration. It can be seen that the tonescale function maps the full dynamic range of the scene exposures into a limited dynamic range of image intensities. Similarly, a series of tonescale functions 80-2 through 80-N are also shown where the dynamic range of the image intensities is larger for each successive tonescale function. The intermediate color gamut digital images 72-2 through 72-N that would be computed using these tonescale functions would therefore have successively larger dynamic ranges associated with them. Note that aside from the limited color gamut digital image 72-1, each of the other intermediate color gamut digital images 72-2 through 72-N will have dynamic ranges that may be larger than that which might be printable on any given output device. However the extra dynamic range information can be useful in many cases for output devices with large effective dynamic ranges, or for performing adjustments to the image.

Figure 9:
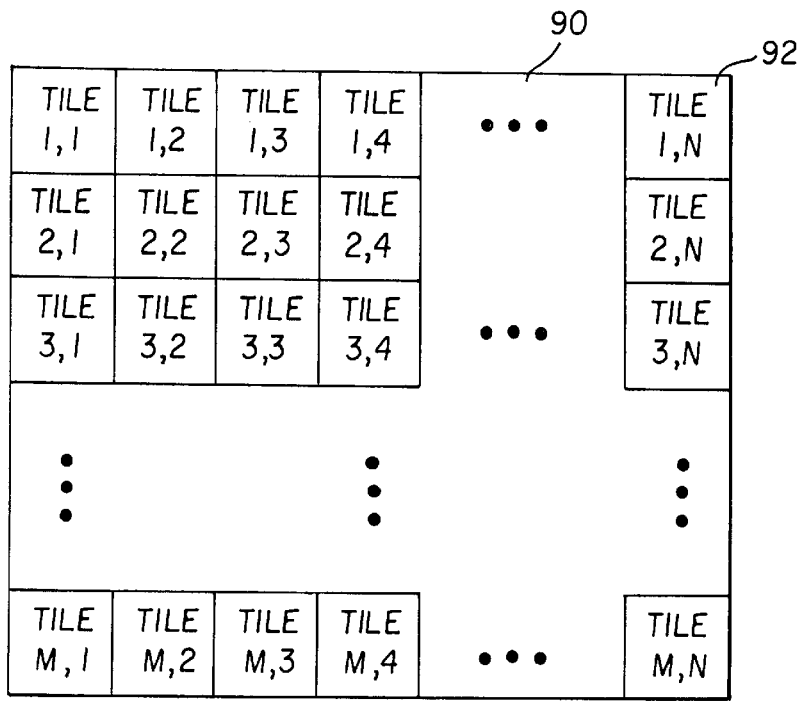
FIG. 9 is a diagram describing a tiled set of residual images.

Another reason that using multiple residual images is useful is for cases where the residual images are stored in tags in the digital file having a limited size. In this case, the residual image data can be broken into smaller pieces that would fit within the tag size limitations. For example, residual images can be determined for subsets of pixels in the extended color gamut digital image. In this way, the residual image data can be stored in smaller pieces that would fit within any tag size limitations. For example, FIG. 9 illustrates a set of residual images 90 corresponding to a difference image computed from an extended color gamut digital image and a limited color gamut digital image as described above. The set of residual images is formed by partitioning the difference image into a series of residual image tiles 92, where each tile corresponds to a subset of the pixels in the extended color gamut digital image 90. In the example shown, the difference image is partitioned into N tiles in the horizontal direction, and M tiles in the vertical direction. It is not necessary that each of the tile sizes be the same in practice.

When a reconstructed extended color gamut digital image is formed from the limited color gamut digital image, and the set of residual images, it may not be necessary to use all of the residual images in the set of residual images. For example, consider the case where a reconstructed extended color gamut digital image only needs to be produced for a cropped portion of the original image. In this case, if the residual images correspond to subsets of pixels in the extended color gamut digital image as discussed with reference to FIG. 9, it is only necessary to use the one or more residual image(s) corresponding to the cropped image region.

A computer program product having a computer readable storage medium can have a computer program stored thereon for performing all the steps of the present invention.

The computer readable storage medium can comprise, for example; magnetic storage media such as magnetic disc (such as a floppy disc) or magnetic tape; optical storage media such as optical disk, optical tape, or machine readable bar code; solid state electronic storage devices such as random access memory (RAM), or read only memory (ROM); or any other physical device or medium employed to store a computer program.

This invention has been described in detail with particular reference to certain preferred embodiments thereof, but it will be understood that variations and modifications can be effected within the spirit and scope of the invention.

PARTS LIST

10 Video RGB Color Gamut
12 Reflection Print Color Gamut
20 extended color gamut digital image
21 adjust color values
22 limited color gamut digital image
23 represent image in storage color space
24 storage space digital image
25 compute residual images
26 set of residual images
27 digital file storage
28 digital file
30 extended color gamut digital image
31 adjust color values
32 represent image in storage color space
33 limited color gamut digital image
34 represent image in extended storage color space
35 compute residual images
36 set of residual images
37 digital file storage
38 digital file
40 digital file
41 extract data from digital file
42 limited color gamut digital image
43 set of residual images
44 reconstruct extended color gamut digital image
45 reconstructed extended color gamut digital image
50 extended color gamut digital image
51 adjust color values
52 represent image in storage color space
53 compress digital image
54 compressed limited color gamut digital image
55 represent image in extended storage color space
56 uncompress limited color gamut digital image
57 compute residual images
58 compress residual images
59 compressed residual images
60 digital file storage
61 digital file
62 extended color gamut digital image
63 limited color gamut digital image
64 compute difference image
65 difference image
66 luminance residual image
67 chrominance residual image(s)
68 set of residual images
70 extended color gamut digital image
71-1 limited color gamut step
71-2 through 71-N intermediate color gamut steps
72-1 limited color gamut digital image
72-2 through 72-N intermediate color gamut digital images
73-1 through 73-N residual images
74 residual images
80-1 tonescale function
80-2 through 80-N tonescale functions
90 set of residual images
92 residual image tiles

What is claimed is:

1. A method for representing a digital image with an extended color gamut in a storage color space having a limited color gamut comprising:
   a) adjusting the color values of the extended color gamut digital image to fit within the limited color gamut to form a limited color gamut digital image;
   b) representing the limited color gamut digital image in the storage color space;
   c) determining differences between the extended color gamut digital image and the limited color gamut digital image forming a set of residual images; and
   d) storing the set of residual images with the limited color gamut digital image in the storage color space such that the associated set of residual images and the limited color gamut digital image is adapted to be used to form a reconstructed extended color gamut digital image.

2. The method of claim 1 where the storage color space is a particular device dependent color space.

3. The method of claim 2 where the storage color space is a video RGB color space.

4. The method of claim 3 further including previewing the digital image by displaying the limited color gamut digital image on a video display.

5. The method of claim 1 where the storage color space is a particular limited color gamut color space.

6. The method of claim 1 where the limited color gamut digital image is determined by clipping colors that are outside the limited color gamut so that they are on the surface of the limited color gamut.

7. The method of claim 1 where the limited color gamut digital image is determined by using gamut mapping that preserves color appearance.

8. The method of claim 1 where the limited color gamut digital image is determined by modifying color values that are outside the limited color gamut so that they are mapped to color values within the limited color gamut.

9. The method of claim 1 where the extended color gamut digital image has a larger range of chroma values than the limited color gamut digital image.

10. The method of claim 1 where the extended color gamut digital image has a larger dynamic range than the limited color gamut digital image.

11. The method of claim 10 where the adjusting the color values of the extended color gamut digital image to determine the limited color gamut digital image includes applying a tonescale function to reduce the dynamic range of the image.

12. The method of claim 10 wherein the extended dynamic range digital image is a monochrome digital image.

13. The method of claim 1 where the extended color gamut digital image is a representation of the colors in an original scene.

14. The method of claim 13 where the limited color gamut digital image is determined by rendering the colors of the original scene to produce rendered color values that are desirable for a first output device.

15. The method of claim 14 where the set of residual images is determined by computing the difference between the rendered color values for the first output device and a second set of rendered color values that are desirable for a second output device having a larger color gamut than the first output device.

16. The method of claim 15 where the larger color gamut output device is a hypothetical output device having an idealized color gamut.

17. The method of claim 1 where the limited color gamut digital image is stored in a digital image file using a digital storage medium.

18. The method of claim 17 where the set of residual images is stored as additional data in the digital image file.

19. The method of claim 17 where a data compression technique is applied to the set of residual images before it is stored so that it uses a smaller amount of digital storage memory.

20. The method of claim 17 where the limited color gamut digital image is stored in the digital image file, and the residual image is stored in a separate digital image file.

21. The method of claim 1 further including using one or more residual images from the set of residual images together with the limited color gamut digital image to form a reconstructed extended color gamut digital image.

22. The method of claim 1 further including using one or more residual images from the set of residual images together with the limited color gamut digital image to form a digital image appropriate for display on an output device having a color gamut different that the limited color gamut.

23. The method of claim 1 where the extended color gamut digital image originates from a scan of a photographic negative.

24. The method of claim 1 where the extended color gamut digital image originates from a scan of a photographic transparency.

25. The method of claim 1 where the extended color gamut digital image originates from a scan of a photographic print.

26. The method of claim 1 where the extended color gamut digital image originates from a digital camera.

27. The method of claim 26 where each residual image in the set of residual images corresponds to a successively larger subset of the extended color gamut.

28. The method of claim 1 where the set of residual images includes a luminance residual image and one or more chrominance residual images.

29. The method of claim 28 where each residual image in the set of residual images is computed from the difference between two intermediate color gamut digital images.

30. The method of claim 29 where the subsets of image pixels are formed by partitioning the extended color gamut digital image into tiles.

31. The method of claim 30 where the desirable modification is interactively user specified.

32. The method of claim 30 where the desirable modification is determined by applying an automatic algorithm to the digital image.

33. The method of claim 1 where each residual image in the set of residual images corresponds to a different subset of the extended color gamut.

34. The method of claim 33 where the intermediate color gamut digital images are determined by using a set of tonescale functions to reduce the extended color gamut dynamic range to a set of intermediate color gamut dynamic ranges.

35. The method of claim 1 where each residual image in the set of residual images corresponds to a subset of image pixels in the extended color gamut digital image.

36. The method of claim 1 where the set of residual images is determined from the extended color gamut digital image represented in an extended storage color space and the limited color gamut digital image represented in the storage color space.

37. A method for representing and manipulating a digital image with an extended color gamut using a storage color space having a limited color gamut comprising:
   a) adjusting the color values of the extended color gamut digital image to fit within the limited color gamut to form a limited color gamut digital image;
   b) representing the limited color gamut digital image in the storage color space;
   c) determining differences between the extended color gamut digital image and the limited color gamut digital image forming a set of residual images;
   d) storing the set of residual images with the limited color gamut digital image in the storage color space such that the associated set of residual images and the limited color gamut digital image is adapted to be used to form a reconstructed extended color gamut digital image;
   e) specifying a desirable modification to the image; and
   f) using the set of residual images together with the limited color gamut digital image and the specified desirable modification to the image to produce a modified digital image.

38. A method for representing a digital image having color values with an extended color gamut in a storage color space having a limited color gamut comprising:
   a) adjusting the color values of the extended color gamut digital image to fit within the limited color gamut to form a limited color gamut digital image;
   b) representing the limited color gamut digital image in the storage color space;
   c) compressing the limited color gamut digital image;
   d) determining a difference between the extended color gamut digital image and an uncompressed limited color gamut digital image computed from the compressed limited color gamut digital image forming a set of residual images; and
   e) storing the set of residual images with the limited color gamut digital image in the storage color space such that the associated residual images and the limited color gamut digital image is adapted to be used to form a reconstructed extended color gamut digital image.

39. A computer program product for representing a digital image with an extended color gamut in a storage color space having a limited color gamut, and having a computer readable storage medium with a computer program stored thereon for performing:
   a) adjusting the color values of the extended color gamut digital image to fit within the limited color gamut to form a limited color gamut digital image;
   b) representing the limited color gamut digital image in the storage color space;
   c) determining differences between the extended color gamut digital image and the limited color gamut digital image forming a set of residual images; and
   d) storing the residual images with the limited color gamut digital image in the storage color space such that the associated residual images and the limited color gamut digital image is adapted to be used to form a reconstructed extended color gamut digital image.

40. A computer program product for representing a digital image with an extended color gamut in a storage color space having a limited color gamut, and having a computer readable storage medium with a computer program stored thereon for performing:

a) adjusting the color values of the extended color gamut digital image to fit within the limited color gamut to form a limited color gamut digital image;

b) representing the limited color gamut digital image in the storage color space;

c) determining differences between the extended color gamut digital image and the limited color gamut digital image forming a set of residual images;

d) storing the set of residual images with the limited color gamut digital image in the storage color space such that the associated set of residual images and the limited color gamut digital image is adapted to be used to form a reconstructed extended color gamut digital image;

e) specifying a desirable modification to the image; and f) using the set of residual images together with the limited color gamut digital image and the specified desirable modification to the image to produce a modified digital image.

41. A computer program product for representing a digital image with an extended color gamut in a storage color space having a limited color gamut, and having a computer readable storage medium with a computer program stored thereon for performing:

a) adjusting the color values of the extended color gamut digital image to fit within the limited color gamut to form a limited color gamut digital image;

b) representing the limited color gamut digital image in the storage color space;

c) compressing the limited color gamut digital image;

d) determining differences between the extended color gamut digital image and an uncompressed limited color gamut digital image computed from the compressed limited color gamut digital image forming a set of residual images; and e) storing the residual images with the limited color gamut digital image in the storage color space such that the associated residual images and the limited color gamut digital image is adapted to be used to form a reconstructed extended color gamut digital image.

\* \* \* \* \*